(12) United States Patent
Tan et al.

(10) Patent No.: US 8,313,672 B2
(45) Date of Patent: Nov. 20, 2012

(54) PROCESS FOR PRODUCING SURGE ABSORBING MATERIAL WITH DUAL FUNCTIONS

(75) Inventors: Yu-Wen Tan, Taipei (TW); Jie-An Zhu, Shanghai (CN); Li-Yun Zhang, Shanghai (CN)

(73) Assignee: Leader Well Technology Co., Ltd. (TW)

( * ) Notice: Subject to any disclaimer, the term of this patent is extended or adjusted under 35 U.S.C. 154(b) by 359 days.

(21) Appl. No.: 12/585,103

(22) Filed: Sep. 3, 2009

(65) Prior Publication Data

US 2009/0321691 A1     Dec. 31, 2009

Related U.S. Application Data

(63) Continuation-in-part of application No. 11/798,967, filed on May 18, 2007, now abandoned.

(51) Int. Cl.
  *H01B 1/22*  (2006.01)
  *H01B 1/02*  (2006.01)

(52) U.S. Cl. ........ 252/513; 252/502; 252/508; 252/514; 252/515; 252/520.2; 252/521.2; 338/20; 338/21; 428/402

(58) Field of Classification Search .................. 252/502, 252/508, 518, 519, 513, 514, 515, 520.2, 252/521.2; 338/20, 21; 428/402
See application file for complete search history.

(56) References Cited

U.S. PATENT DOCUMENTS

| 4,110,260 | A | 8/1978 | Yamamoto et al. |
| 4,992,333 | A | 2/1991 | Hyatt |
| 5,068,634 | A | 11/1991 | Shrier |
| 6,245,439 | B1 | 6/2001 | Yamada et al. |
| 2004/0201941 | A1 | 10/2004 | Harris et al. |
| 2008/0191834 | A1 | 8/2008 | Lien et al. |

OTHER PUBLICATIONS

Xue Ya et al "Sol-Gel Process Doped ZnO Nanopowders and Their Grain Growth," Materials Research Bulletin, vol. 32, No. 9, 1165-1171, 1997.

*Primary Examiner* — Khanh Tuan Nguyen
(74) *Attorney, Agent, or Firm* — Bacon & Thomas, PLLC

(57) ABSTRACT

A kind of manufacturing method for dual functions with varistor material and device has one of the characteristics among capacitance, inductance, voltage suppressor and thermistor in addition to surge absorbing characteristic, which microstructural compositions include a glass substrate with high resistance and three kinds of low-resistance conductive or semiconductive particles in micron, submicron and nanometer size uniformly distributed in the glass substrate to provide with good surge absorbing characteristic.

7 Claims, 2 Drawing Sheets

PROCESS FOR PRODUCING SURGE ABSORBING MATERIAL WITH DUAL FUNCTIONS

CROSS REFERENCE TO RELATED APPLICATIONS

This application is a CIP of U.S. patent application Ser. No. 11/798,967 filed May 18, 2007, now pending.

BACKGROUND OF THE INVENTION

1. Field of the Invention

The present invention relates to a process for producing surge absorbing material, and more particularly, to a process for producing surge absorbing material with dual functions having one of the characteristics among capacitance, inductance, voltage suppressor and thermistor in addition to surge absorbing characteristic.

2. Description of the Related Art

Surge or electrical overstress produced by a lightning strike, switching operation or damage of other component may disturb or damage electronic components or other sensitive electric equipment. Therefore, surge absorbers (or called varistors) with good surge absorbing capability are widely used as components for providing protection against electrical overstress or surge of electronic components, electronic circuits or electronic equipment.

Moreover, it is a popular trend to combine two components of different functions as a single structure by a laminating process. For example, inductance and capacitance are combined as a single SMD-type (surface mounting device) component to become an inductance-capacitance filter (LC filter) with filtering function; or, resistance and capacitance are combined as a single SMD-type component to become a resistance-capacitance filter (RC filter) with filtering function.

However, when two components of different functions are combined as a single structure by a laminating process, a residual stress is easily occurred between the two components because sintering temperatures and shrinkage rates of the two components are different, and then there are problems of separation and ineffectiveness occurred after the two components of different functions are sintered together into a single structure.

For solving the problems mentioned above, some prior arts disclose a low-temperature glass disposed between a surge absorber and a ceramic condenser to enhance the connection of the two materials. Some prior arts disclose a varistor layer mainly composed of Zinc oxide with different additional elements to provide the material with functions of surge absorber and inductor, and then the two layers are combined by a laminating process and sintered together.

In addition, in some researches, for improving the problem of bad electrical characteristics due to mutual diffusivity during the sintering process of two materials, insulating layers with varying contents are disposed between two components.

However, although the methods mentioned above can produce components of multiple functions, the processes are relatively complicated. For instance, glass or an insulating layer with varying contents needs to be added into two materials of components to provide the components with electrical characteristics. Moreover, in such processes, two components requiring different sintering atmospheres cannot be sintered together, and thus the product cannot have good electrical characteristics.

SUMMARY OF THE INVENTION

One object of the present invention is to provide a method for producing a surge absorbing material with dual functions. By a first-order, second-order or third-order dispersing method, conductive or semiconductive particles of micron, submicron and nanometer size are wrapped in a suitable material of a glass phase, and then sintered to have good surge absorbing characteristic. Furthermore, when the material of a glass phase is selected from materials with one of the characteristics among capacitance, inductance, voltage suppressor and thermistor, the surge absorbing material becomes a material with dual functions having one of the characteristics among capacitance, inductance, voltage suppressor and thermistor in addition to surge absorbing characteristic, and the problem of separation and ineffectiveness occurred when two materials of different characteristics are sintered together into a single structure can be solved.

The other object of the present invention is to provide a surge absorbing material with dual functions, which material compositions include a glass substrate with high resistance and low-resistance conductive or semiconductive particles including micron, submicron and nanometer size distributed in the glass substrate, particularly, conductive or semiconductive particles of submicron size are uniformly distributed in conductive or semiconductive particles of micron size, and conductive or semiconductive particles of nanometer size are uniformly distributed in conductive or semiconductive particles of submicron size.

When such surge absorbing material of the present invention is used in producing laminated components, the problem of cofiring different materials as a single structure is not necessarily considered any more and the laminating process is relatively simple and easy.

DETAILED DESCRIPTION OF THE PREFERRED EMBODIMENT

Figure 1:
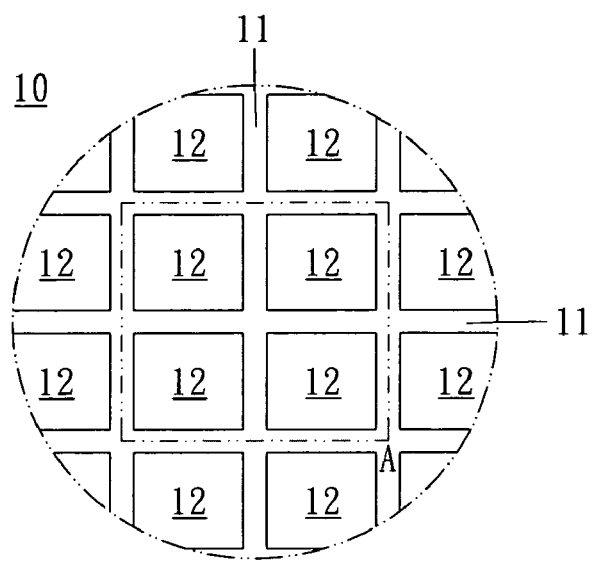
FIG. 1 is a schematic view showing microstructural compositions of a surge absorbing material according to one preferred embodiment of the present invention.
Figure 2:
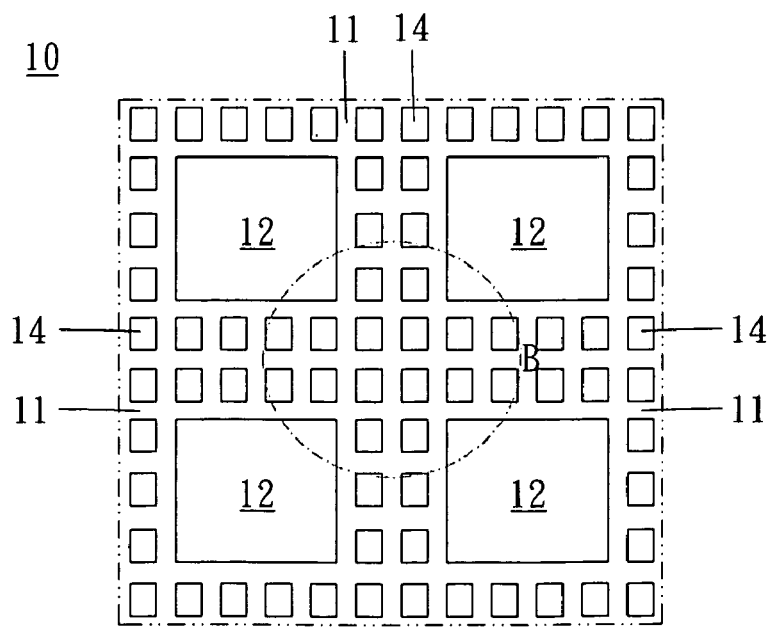
FIG. 2 is an enlarged view of the A area in FIG. 1.
Figure 3:
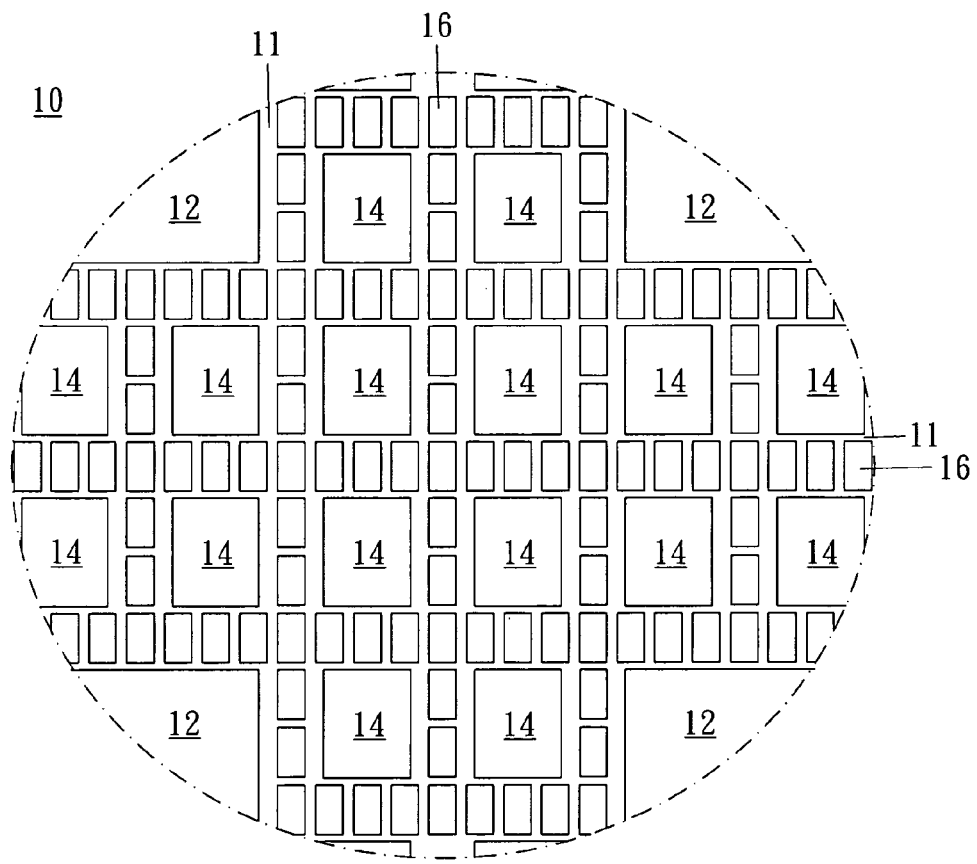
FIG. 3 is an enlarged view of the B area in FIG. 2.

As shown from FIG. 1 to FIG. 3, the microstructural composition of a surge absorbing material 10 of the present invention provided with dual functions includes a glass substrate 11 with high resistance and micron, submicron and nanometer sized conductive or semiconductive particles 12, 14 and 16 with low-resistance uniformly dispersed in the glass substrate 11.

The particle diameter of micron sized conductive or semiconductive particles 12 is larger than 0.1 μm, the particle diameter of submicron sized conductive or semiconductive particles 14 is between 0.01 μm to 0.1 μm, and the particle diameter of nanometer sized conductive or semiconductive particles 16 is smaller than 0.01 μm.

The conductive particle is selected from one or more of Pt, Pd, W, Au, Al, Ag, Ni, Cu, Fe and alloy thereof.

The semiconductive particle is selected from one of ZnO, $TiO_2$, $SnO_2$, Si, Ge, SiC, Si—Ge alloy, InSb, GaAs, InP, GaP, ZnS, ZnSe, ZnTe, $SrTiO_3$ and $BaTiO_3$.

Illustrated more details, the surge absorbing material 10 of the present invention provided with dual functions includes glass substrate 11 of 3% to 60% and micron, submicron and nanometer sized conductive or semiconductive particles 12, 14 and 16 of 40% to 97%, wherein the micron sized particles 12 are 35% to 96.49%, the submicron sized particles 14 are 0.5% to 8%, preferably of 0.5% to 4%, and the nanometer sized particle are 0.01% to 1%, based on the total weight of the surge absorbing material 10 of the present invention.

All three sizes of particles 12, 14 and 16 with low-resistance are uniformly dispersed in the glass substrate 11 with high resistance, and such compositions at least provide the surge absorbing material 10 of the present invention having the characteristic of surge absorber.

Moreover, in the microstructural compositions of the surge absorbing material 10 of the present invention, the micron sized particles 12 are uniformly dispersed in the glass substrate 11 by first-order dispersion as shown in FIG. 1; the submicron sized particles 14 are uniformly dispersed in the glass substrate 11 as well as in between the first-order dispersed particles 12 by second-order dispersion as shown in FIG. 2; and the nanometer sized particles 16 are uniformly dispersed in the glass substrate 11 as well as in between the second-order dispersed particles 14 by third-order dispersion as shown in FIG. 3.

Figure 4:
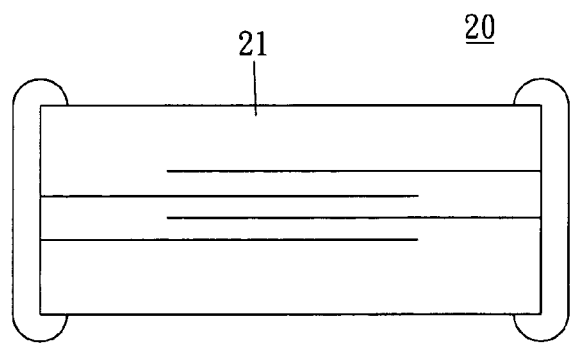
FIG. 4 is a schematic view showing a laminated chip surge absorber.

When a ceramic layer 21 of a laminated chip surge absorber 20 as shown in FIG. 4 is made by the surge absorbing material 10 of the present invention provided with dual functions, due to the ceramic layer 21 made of heat-resisting glass material whose microstructural compositions at least having micron and submicron sized conductive or semiconductive particles 12 and 14 uniformly dispersed therein, the laminated chip surge absorber 20 is endurable to heat of generation from electrostatic shocks and surge overstresses.

Most of all, second-order dispersed submicron sized and third-order dispersed nanometer sized conductive or semiconductive 14 and 16 are further contained in the ceramic layer 21 of the laminated chip surge absorber 20 of FIG. 4, and the particle distances of nanometer sized conductive or semiconductive particles 16 are so small that a tunnel effect occurs when an abnormal electrical overstress is applied. Thus, the laminated chip surge absorber 20 of FIG. 4 has good electrical overstress suppressing capability and electrostatic shock resistance, as well as a good lifespan.

In sum, the surge absorbing material 10 of the present invention provided with dual functions has one of the characteristics among capacitance, inductance, voltage suppressor and thermistor in addition to surge absorbing characteristic by choosing the glass substrate 11 from one of a capacitance glass state component, an inductance glass state component, a voltage suppressor glass state component and a thermistor glass state component. In other words, the surge absorbing material 10 of the present invention is a material provided with dual functions.

A process for producing the surge absorbing material 10 of the present invention provided with dual functions comprises the following steps:

a) Preparing a sol solution of glass phase composition in an amount of 3% to 60% by weight of the surge absorbing material through a sol-gel process; wherein the glass phase composition selected from the group consisting of a capacitance glass state component, an inductance glass state component, a voltage suppressor glass state component and a thermistor glass state component.

When the glass substrate 11 is the capacitance glass state composition, the glass substrate 11 can be selected from silicate glass, aluminosilicate glass, borate glass and phosphate glass with general capacitance characteristics and $BaTiO_3$, $SrTiO_3$, $CaTiO_3$ and $TiO_2$ with high dielectric constants.

When the glass substrate 11 is the inductance glass state composition, the glass substrate 11 can be selected from a series of Ni—Zn or Ni—Cu—Zn inductance material of general inductance characteristics, or a LTCC (Low Temperature Cofired Ceramic) material with high frequency inductance characteristics.

When the glass substrate 11 is the voltage suppressor glass state composition, the glass substrate 11 can be an electrical overstress suppressing material such as $BaTiO_3$, PZT and PLZT.

When the glass substrate 11 is the thermistor glass state composition, the glass substrate 11 can be a thermistor material with general thermistor characteristics such as a Mn—Ni or Mn—Co—Ni system with NTC characteristic or a V—P—Fe system with CTR characteristic.

b) Dispersing nanometer sized conductive or semiconductive particles with a particle diameter of smaller than 0.01 µm in an amount of 0.01% to 1% by weight of the surge absorbing material into the sol solution of glass phase composition in step a).

The nanometer particles can be metal conductive particles comprising Pt, Pd, Au, Ag, Ni, Cu and so on, or semiconductive particles comprising SiC, ZnO, $TiO_2$, $SnO_2$, $SrTiO_3$, $BaTiO_3$ and so on.

c) Dispersing submicron sized conductive or semiconductive particles with a particle diameter of 0.01 µm to 0.1 µm in an amount of 0.5% to 8% by weight of the surge absorbing material into the sol solution of glass phase composition having dispersed the nanometer sized particles therein in step b);

d) Dispersing micron sized conductive or semiconductive particles with a particle diameter of larger than 0.1 µm in an amount of 35% to 96.49% by weight of the surge absorbing material into the sol solution of glass phase composition having dispersed both the nanometer and submicron sized particles therein in step c);

e) Dying and calcining the sol solution of glass phase composition after step d) at temperature of lower than 1000° C.; and finally milling the calcined composite material to become the surge absorbing material 10 of the present invention provided with dual functions.

The surge absorbing material 10 of the present invention provided with dual functions has one of the characteristics among capacitance, inductance, voltage suppressor and thermistor in addition to surge absorbing characteristic. Thus, when producing various components from the surge absorbing material 10 with dual functions, which characteristic between capacitance, inductance, voltage suppressor and thermistor in addition to surge absorbing characteristic is to be provided on the component should be considered.

For instance, when the surge absorbing material 10 of the present invention is a material having inductance characteristic in addition to surge absorbing characteristic, the surge absorbing material 10 with dual functions may be produced as a surge absorber or a filtering component with both electromagnetic wave disturbance (EMI) preventing capability and electrostatic discharge (ESD) preventing capability. Moreover, the material of such filtering component has good surge and electrostatic absorbing capability, and the material retains original characteristics after multiple times of surge and electrostatic shocks.

Example 1

NTC Thermistor was selected as a continuous phase of material. It was prepared from 11.99 g $Mn(CH_3COO)$ $_2$.2H$_2$O, 10.96 g Co(CH$_3$COO)$_2$.2H$_2$O and 3.98 g Ni(CH$_3$COO)$_2$.2H$_2$O respectively. The raw material was solved in excess of citric acid (mole ratio Mn: Co: Ni: citric acid=0.045: 0.044: 016: 0.12) using deionized water. In the stirring condition and heated up 60° C., the raw materials completely dissolved to sol condition.

Take 0.07 g of nanometer sized Pd powder with a particle diameter of 8 nm and uniformly disperse into the previous sol solution at the stirring condition. Then, uniformly disperse 1.1 g of submicron sized Pt particles with a particle diameter of 0.05 μm into the sol solution having already added the nanometer sized Pt particles. Further take 79.64 g of micro sized ZnO powder with a particle diameter of 0.65 μm and uniformly disperse into the solution having nanometer sized Pd particles and submicron sized Pt particles uniformly dispersed therein.

Finally, heat the previous solution up to 80° C. to remove excess amount water until the sol solution becomes a viscid state. Then the sample which is taken from the sol solution become in viscid state is gelatinized after 2 days. Heat the gel stated sample up to 170° C. to remove water. Then the sample was ground to powder.

Let this powder be calacined at 700° C. for 3 hr. The final powder product will have dual functions of both NTC thermistor and varistor properties after the aforementioned process.

Under sintering temperature of 1040° C. the previous calcined powder was manufactured to a ceramic chip device with size 2220 by standard multilayer ceramic process. The electrical properties of the ceramic chip device with size 2220 were measured by Kathley 168 and shown as the Table 1.

TABLE 1

| V1mA (V) | Alpha | iL (uA) | Surge (8/20 μS) | R (ohm) at 25° C. | B (° K) |
|---|---|---|---|---|---|
| 23.57 | 25.47 | 47.2 | 1800 | 645K | 4032 |

From the above results, it was found that this ceramic chip device has both good varistor and NTC thermister characteristic. In other words, this ceramic chip device has dual functions of both NTC thermistor and varistor properties.

Example 2

B—Si glass was selected as a continuous grain phase. The raw materials include of H$_3$BO$_3$, silicon tetraethoxide (TEOS), and ethanol. The precursor concentrations were investigated, i.e., TEOS: H$_3$BO$_3$: ethanol: water=2.09: 0.31: 50: 50 (weight ratio). The raw material were used a sol-gel method to format a sol composition of glass.

Take 0.11 g of nanometer sized conductive Pt particles with a particle diameter of 6 nm and uniformly disperse into the previous sol solution of glass at the stirring condition. Then, uniformly disperse 0.82 g of submicron sized conductive Ag particle with a particle diameter of 0.08 μm into the sol solution of glass having dispersed the nanometer sized Pt particles. Further take 96 g of micro sized ZnO particle with a particle diameter of 1.2 μm and uniformly disperse into the sol solution of glass having nanometer sized Pt particles and submicron sized Ag particles uniformly dispersed therein at the stirring condition.

After complete the gelatinized process as mentioned in Example 1, the powder was fired at 600° C. for 2 hr. Those calcined powder have dual functions of both capacitance and varistor properties.

Those powders were manufactured to a ceramic chip device with 0402 size by the multilayer ceramic process. The electric properties of the ceramic chip device with 0402 size are shown as the table 2.

TABLE 2

| V1mA (V) | Alpha | iL (uA) | C (pF) |
|---|---|---|---|
| 12.24 | 18.26 | 3.66 | 130 |

Example 3

SiO$_2$—TiO$_2$ glass was manufactured by sol-gel method from inorganic precursors included of silicon tetraethoxide and titanium tetra butoxide.

Mix 10.415 g silicon tetraethoxide (TEOS) and 68.035 g titanium tetra-n-butoxide (TNBT) with proper amount of alcohol and hydrochloric acid by molar ratio of TEOS: TNBT: ethanol: HCl=1: 4: 40: 0.15. The compounds have been stirred on the magnetic stirrer for 30 minutes to become sol solution of glass.

Take 0.12 g of nanometer sized Au particles with a particle diameter of 7 nm and uniformly disperse into the previous sol solution of glass at the stirring condition. Then, uniformly disperse 0.82 g of submicron sized SiC particles with a particle diameter of 0.007 μm into the sol solution of glass having dispersed the nanometer sized Au particles. Further take 102 g of micro sized ZnO particles with a particle diameter of 0.81 μm and uniformly disperse into the sol solution of glass having nanometer sized Au particles and submicron sized SiC particles uniformly dispersed therein at the stirring condition. After complete the gelatinized process as mentioned in Example 1, the powder was fired at 700° C. for 2 hr. Those calcined powder have dual functions of both capacitance and varistor properties. Under sintered at 1030° C. for 2 hr, those powders were manufactured to a ceramic chip device with 0402 size by the multilayer ceramic process. The electric properties of the ceramic chip device with 0402 size are shown as the table 3.

TABLE 3

| V1mA (V) | Alpha | iL (uA) | C (pF) |
|---|---|---|---|
| 15.63 | 21.66 | 2.12 | 394 |

Compared with the results shown in Table 2 and Table 3, it was found that the ceramic chip device would have different capacitance by selecting different glass composition.

What is claimed is:

1. A process for producing a surge absorbing material provided with dual functions of having one of the characteristics among capacitance, inductance, voltage suppressor and thermistor in addition to surge absorbing characteristic, comprising the steps of:
   a) preparing a sol solution of glass phase composition in an amount of 3% to 60% by weight of the surge absorbing material through a sol-gel process; wherein the glass phase composition selected from the group consisting of a capacitance glass state component, an inductance glass state component, a voltage suppressor glass state component and a thermistor glass state component;
   b) dispersing nanometer sized conductive or semiconductive particles with a particle diameter of smaller than 0.01 μm in an amount of 0.01% to 1% by weight of the surge absorbing material into the sol solution of glass phase composition in step a);

c) dispersing submicron sized conductive or semiconductive particles with a particle diameter of 0.01 μm to 0.1 μm in an amount of 0.5% to 8% by weight of the surge absorbing material into the sol solution of glass phase composition having dispersed the nanometer sized particles therein in step b);

d) dispersing micron sized conductive or semiconductive particles with a particle diameter of larger than 0.1 μm in an amount of 35% to 96.49% by weight of the surge absorbing material into the sol solution of glass phase composition having dispersed both the nanometer and submicron sized particles therein in step c);

e) dying and calcining the sol solution of glass phase composition after step d) at temperature of lower than 1000° C.; and finally milling the calcined composite material to become the surge absorbing material.

2. The process for producing a surge absorbing material as defined in claim 1, wherein the capacitance glass state component comprises a capacitance material selected from the group consisting of silicate glass, aluminosilicate glass, borate glass and phosphate glass; or a high dielectric constant material selected from the group consisting of $SrTiO_3$, $CaTiO_3$ and $TiO_2$ with high dielectric constants.

3. The process for producing a surge absorbing material as defined in claim 1, wherein the inductance glass state component comprises an inductance material selected from the group consisting of Ni—Zn, Ni—Cu—Zn, and a LTCC material with high frequency inductance characteristics.

4. The process for producing a surge absorbing material as defined in claim 1, wherein the voltage suppressor glass state component comprises an electrical overstress suppressing material selected from the group consisting of PZT and PLZT.

5. The process for producing a surge absorbing material as defined in claim 1, wherein the thermistor glass state component comprises a material selected from the group consisting of Mn—Ni, a Mn—Co—Ni system with NTC characteristic, and a V—P—Fe system with a CTR characteristic.

6. The process for producing a surge absorbing material as defined in claim 1, wherein the conductive particles are selected from the group consisting of one or more of Pt, Pd, W, Au, Al, Ag, Ni, Cu and alloy thereof.

7. The process for producing a surge absorbing material as defined in claim 1, wherein the semiconductive particle are selected from the group consisting of one or more of ZnO, $TiO_2$, $SnO_2$, Si, Ge, SiC, Si—Ge alloy, InSb, GaAs, InP, GaP, ZnS, ZnSe, ZnTe and $SrTiO_3$.

* * * * *